INVENTOR.
EARL W. SPRINGER
BY
Hood, Gust, Irish & Lundy
ATTORNEYS

Jan. 26, 1971 E. W. SPRINGER 3,559,010

MEANS FOR PREVENTING CROSS-TALK EFFECTS IN A TWO-CHANNEL SYSTEM

Filed April 21, 1969 2 Sheets-Sheet 2

INVENTOR.
EARL W. SPRINGER
BY Wood, Gust, Irish & Lundy
ATTORNEYS

United States Patent Office 3,559,010
Patented Jan. 26, 1971

3,559,010
MEANS FOR PREVENTING CROSS-TALK EFFECTS IN A TWO-CHANNEL SYSTEM
Earl W. Springer, Box 220, Fairland, Ind. 46126
Filed Apr. 21, 1969, Ser. No. 818,012
Int. Cl. G05f 1/00
U.S. Cl. 318—110 8 Claims

ABSTRACT OF THE DISCLOSURE

A system comprising an output means and circuit means for operating the output means, the circuit means including one network or channel for driving the output means in one direction and a second network or channel for driving the output means in the opposite direction. The one network includes a first amplifier means arranged to oscillate at a first predetermined frequency and the second network includes a second amplifier means arranged to oscillate at a second and significantly different predetermined frequency, whereby the likelihood that spurious signals developed by operation of one of said networks will cause operation of the other of said networks is substantially eliminated. Preferably, each amplifier means is a pulse-type oscillator, the output of which is controlled by an input signal charging a control capacitor to a predetermined voltage level. In one amplifier means, this capacitor provides one capacitance and, in the other amplifier means, this capacitor provides another and significantly different capacitance.

It is a primary object of my invention to provide, in a system comprising an output means and a two-channel network for operating the output means, means for eliminating the effects of cross-talk between the networks. In my system, one network is provided for driving the output means in one direction and the other network is provided for driving the output means in the opposite direction. Each network includes an amplifier means. The amplifier means in one network is arranged to oscillate at a first predetermined frequency and the amplifier means in the other network is arranged to oscillate at a second and significantly different predetermined frequency, whereby the likelihood that spurious signals developed by operation of one of the networks will cause operation of the other of the networks is substantially eliminated.

Preferably, each of my amplifier means is a pulse-type oscillator, the output of which is controlled by an input signal charging a control capacitor to a predetermined voltage level. In one of the amplifier means, this capacitor provides a first capacitance and, in the other amplifier means, this capacitor provides a second and significantly different capacitance. It is this difference in capacitance which provides the difference in oscillation frequency. Further, the time required to charge the control capacitor of one amplifier means is significantly different from the time required to charge the control capacitor of the other amplifier means.

Particularly, it is an object of my invention to provide such an amplifier arrangement when each network includes, at its input end, sensing means providing signal levels in the microampere range and, at its output end, an electromagnetic driver requiring, for instance, up to six amperes at twelve volts. It will be appreciated that, when one of the networks is energized to operate the output means, the spurious signals developed by the one network will be sufficient, in many cases, to energize the other network. This problem of spurious signals in a two-channel or a dual network system is commonly referred to as cross-talk. This cross-talk problem is particularly critical and difficult to solve when both channels of a system are extremely sensitive, i.e., are energized by extremely low level inputs, such as those signals generated by light-responsive devices.

I refer now to my pending application Ser. No. 739,406 filed June 24, 1968 and titled "Altitude Indicating and Reporting System." In that application, I have disclosed an output means which is a shaft-driven encoder and a first rotary stepping motor for driving the encoder in one direction and a second rotary stepping motor for driving the encoder in the opposite direction. Each motor is energized through a network comprising a light sensing device, amplifier means connected to the light sensing device and arranged to provide an amplified output when the light sensing device is subjected to a predetermined level of light, and a silicon controlled rectifier for energizing the motor, the gate control electrode of the rectifier being connected to the output of the amplifier means. Thus, when the light sensing device of one network is subjected to a predetermined level of light, the encoder is driven in one direction and, when the other light sensing device is subjected to the predetermined level of light, the encoder is driven in the opposite direction. Since light sensing devices and light responsive devices, or for that matter, any device for sensing relatively low energy levels, have relatively low level signal outputs, the circuitry associated with such devices must be extremely sensitive to low level signals. Thus, cross-talk problems are prevalent in such two-channel systems.

In this description and in the claims appended hereto, the terms "output means" are to be interpreted as including any device for doing work or recording information and which can be driven by an electromagnetic device. Further, in this description and in the claims appended hereto, the terms "means for driving said output means" are to be interpreted as including any type of electromagnetic driving device. Still further, in this description and in the appended claims, the terms "sensing means" is to be interpreted as including any type of sensing device for sensing a physical occurrence and providing a relatively low level signal output.

It is an object of my invention, therefore, to provide a system, such as my altitude indicating and reporting system, comprising output means, first means for driving the output means in one direction, second means for driving the output means in the opposite direction, first sensing means, second sensing means, first circuit means for operatively connecting the first sensing means to the first drive means, and second circuit means for operatively connecting the second sensing means to the second drive means. Preferably, the first circuit means includes first switch means for energizing the first drive means and first amplifier means for operating the first switch means to energize the first drive means when the first sensing means provides a predetermined output and the second circuit means includes a second switch means for energizing the second drive means and second amplifier means for operating the second switch means to energize the second drive means when the second sensing means provides a predetermined output.

As stated previously, each of my amplifier means is preferably a pulse-type oscillator. I prefer that each oscillator include a unijunction transistor, the emitter electrode of which is connected to a control capacitor, and the breakdown of which is caused when the capacitor is charged to a predetermined voltage. The control capacitor of each oscillator primarily determines the frequency of oscillation for the oscillator. Thus, it is my concept to have the control capacitor of one oscillator or amplifier means be of a significantly different value than the control capacitor of the other oscillator or amplifier means. It will be appreciated, as this description progresses, that this difference in value of capacitance will cause a significant difference in the amount of time required for operation of the two oscillators. That is, the oscillator with the lower value control capacitor will, for a given signal level input, operate its associated switch means significantly faster than the oscillator having the higher value control capacitor will operate its associated switch means.

Other objects and features of my invention will become apparent as this description progresses.

To the accomplishment of the above and related objects, my invention may be embodied in the form illustrated in the accompanying drawings, attention being called to the fact, however, that the drawings are illustrative only and that changes may be made in the specific construction illustrated and described, so long as the scope of the appended claims is not violated.

Figure 1:
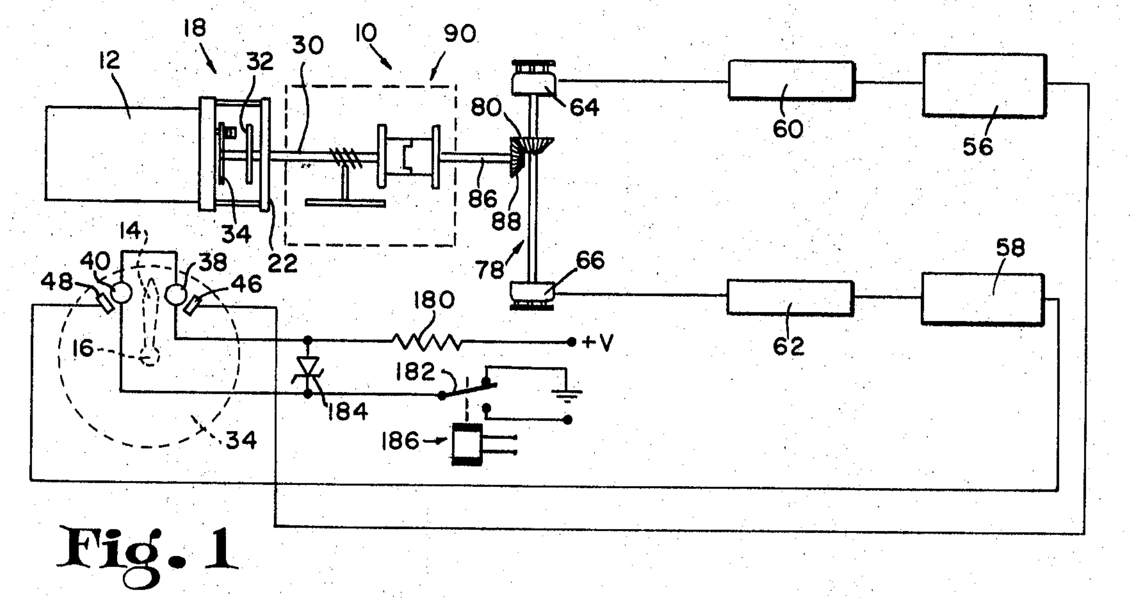
FIG. 1 is a block diagram of one embodiment of my system disclosed in my aforesaid application Ser. No. 739,406.

Referring now to FIG. 1, it will be seen that my altitude indicating and reporting system, indicated generally by the reference numeral 10, is illustrated, the system comprising a standard aircraft altimeter 12 which is equipped with an indicator or pointer 14 arranged for pivotal movement about an axis indicated at 16 and means, indicated generally by the reference numeral 18, for tracking the movement of the indicator 14. The altimeter 12 has a glass cover plate covering and protecting the indicator 14 and the scale about which the indicator moves. My tracking means 18 is arranged to track the movement of the indicator 14 by projecting and reflecting light through this cover plate.

Specifically, the tracking means 18 is mounted in front of the cover plate of the altimeter to be in alignment with the pivot axis 16 of the indicator 14. As illustrated, I mount a support plate 22 on the front face of the altimeter by means of stand-offs, the support plate carrying a centrally located bearing (not shown) defining a journal axis extending through the pivot axis 16 of the indicator 14. The tracking means 18 comprises a shaft 30 journalled in this bearing in the support plate 22 and a slip-ring commutator 32 and another support plate 34 mounted on the shaft 30 for rotation therewith. The slip-ring commutator 32 is conventional in structure, and used for conventional purposes.

I have provided a pair of light sources 38, 40 mounted on the support plate 34 to direct light through the cover plate of the altimeter toward the path of movement of the indicator 14. A light-responsive device 46, 48 is associated with each light source 38, 40, the light-responsive surface of each device facing the path of movement of the indicator 14. Each light-responsive device 46, 48 is arranged electrically to change state when the amount of light impinging thereon, i.e., impinging on its light-responsive surface, changes to a predetermined degree. Thus, since I project light at the path of movement of the indicator 14, when the indicator moves adjacent to one of the light-responsive devices 46, 48, the indicator will reflect light back toward the device to cause it to change state.

Any number of types of light-responsive devices will electrically change state when the amount of light impinging thereon is changed. Thus, I am not limited to any particular light-responsive device. For instance, there are commercially available light-actuated transistors and diodes which will permit current flow or prevent current flow depending on the amount of light impinging thereon. For reasons which will become apparent as this description progresses, I prefer to use a simple photovoltaic cell for generating an electrical potential upon the incidence of light thereon. Such cells which are normally fabricated from a material such as selenium or silicon, are particularly suited for my system because of their reliability and extremely small size. Presently, I prefer to use such cells which are fabricated from silicon and which will produce approximately 18 microamperes across a microammeter having a measured DC resistance of 8000 ohms when the indicator 14 reflects light back thereon. Thus, it is necessary to amplify, in some manner, the outputs of the light-responsive devices 46, 48 so that these outputs can be used by other electrical equipment.

Referring now to the block diagram of FIG. 1, it will be seen that I have provided an amplifier for amplifying the output of each light-responsive device 46, 48, these amplifiers being indicated by the reference numerals 56, 58. Each amplifier 56, 58 is coupled to and arranged to energize a silicon controlled rectifier 60, 62 which is, in turn, connected to and arranged to energize a rotary stepping motor 64, 66. These rotary stepping motors 64, 66 comprise drive means for the support plate 34 on which the light sources 38, 40 and light-responsive devices 46, 48 are mounted. That is, the motors 64, 66 drive a common shaft 78 which is coupled through bevel gears 80, 88 and a shaft 86 to the shaft 30 on which the support plate 34 is mounted.

In FIG. 1, and as disclosed in my aforesaid pending application Ser. No. 739,406, I provide an encoder 90 for registering the position of the shaft 30, thereby to register the altitude indicated by the pointer 14. Thus, the encoder 90 is an output means which is driven in one direction by the rotary stepping motor 64 and in the opposite direction by the rotary stepping motor 66. The amplifier means 56 and silicon controlled rectifier 60 comprise circuit means for operatively connecting the motor 64 to the device 46 while the amplifier means 58 and silicon controlled rectifier 62 comprise circuit means for operatively connecting the motor 66 to the device 48. Within the scope of my invention, the motors 64, 66 are drive means and the devices 46, 48 are sensing means.

I prefer to use rotary stepping motors 64, 66 which are solenoid-type, rotary stepping motors. I have found that such a motor sold under the commercial name Ledex is suitable for the purpose of driving the encoder 90 and the support plate 34. I prefer to use Ledex units which require 6 amperes at 12 volts DC for normal rotation.

Figure 2:
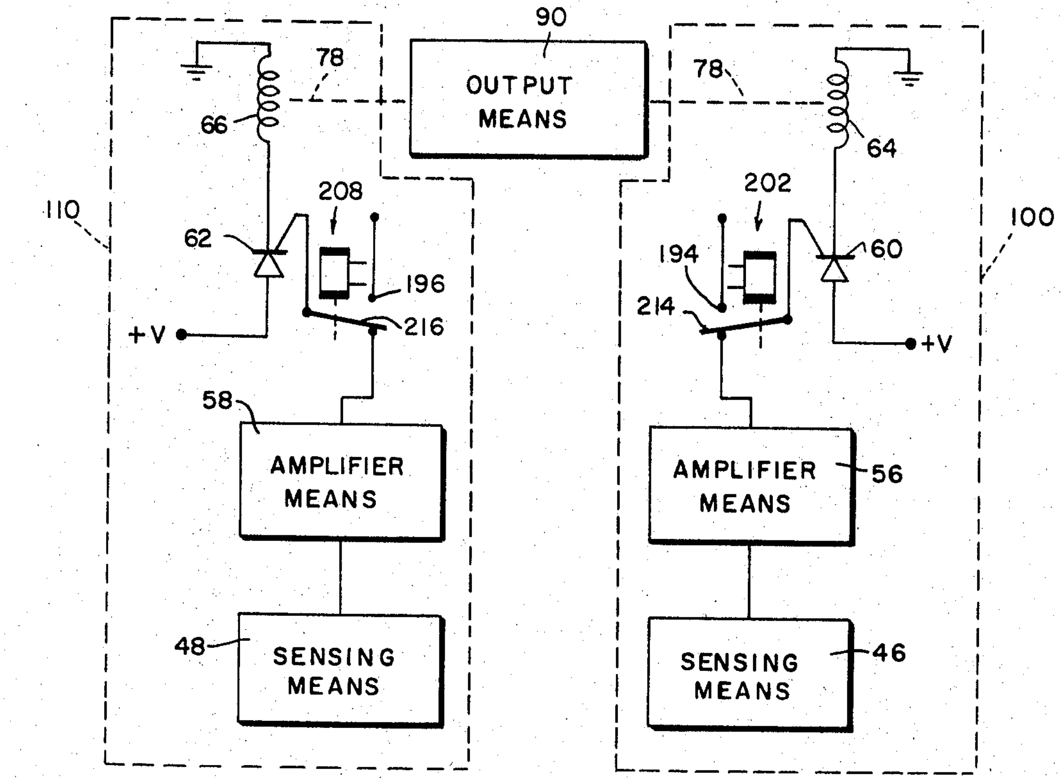
FIG. 2 is a block diagram showing a system of the general type with which my present invention is concerned.

FIG. 2 is a simplified block diagram of the type of system illustrated in FIG. 1, like reference numerals representing like parts. One of the two channels or networks of the system in FIG. 2 is indicated by the reference numeral 100 and the other of the two channels or networks is indicated by the reference numeral 110. The channel 100 comprises first drive means 64 for driving the output means 90 in one direction, first sensing means 46, and first circuit means for operatively connecting the first sensing means to the first drive means, the first circuit means including first switch means 60 for energizing the first drive means and first amplifier means 56 for operating the first switch means to energize the first drive means when the first sensing means provides a predetermined output. Similarly, the channel 110 comprises second drive means 66 for driving the output means 90 in the opposite direction, second sensing means 48, and second circuit means for operatively connecting the second sensing means to the second drive means, the second circuit means including second switch means 62 for energizing the second drive means and second amplifier means 58 for operating the second switch means to energize the second drive means when the second sensing means provides a predetermined output.

Since each amplifier means 56, 58 must be sensitive to signal levels less than 18 microamperes, if a cross-talk situation develops, one motor 64, 66 may be driving the output means 90 in one direction while the other motor is attempting to drive the output means in the opposite direction. Thus, a locking situation may develop.

Figure 3:
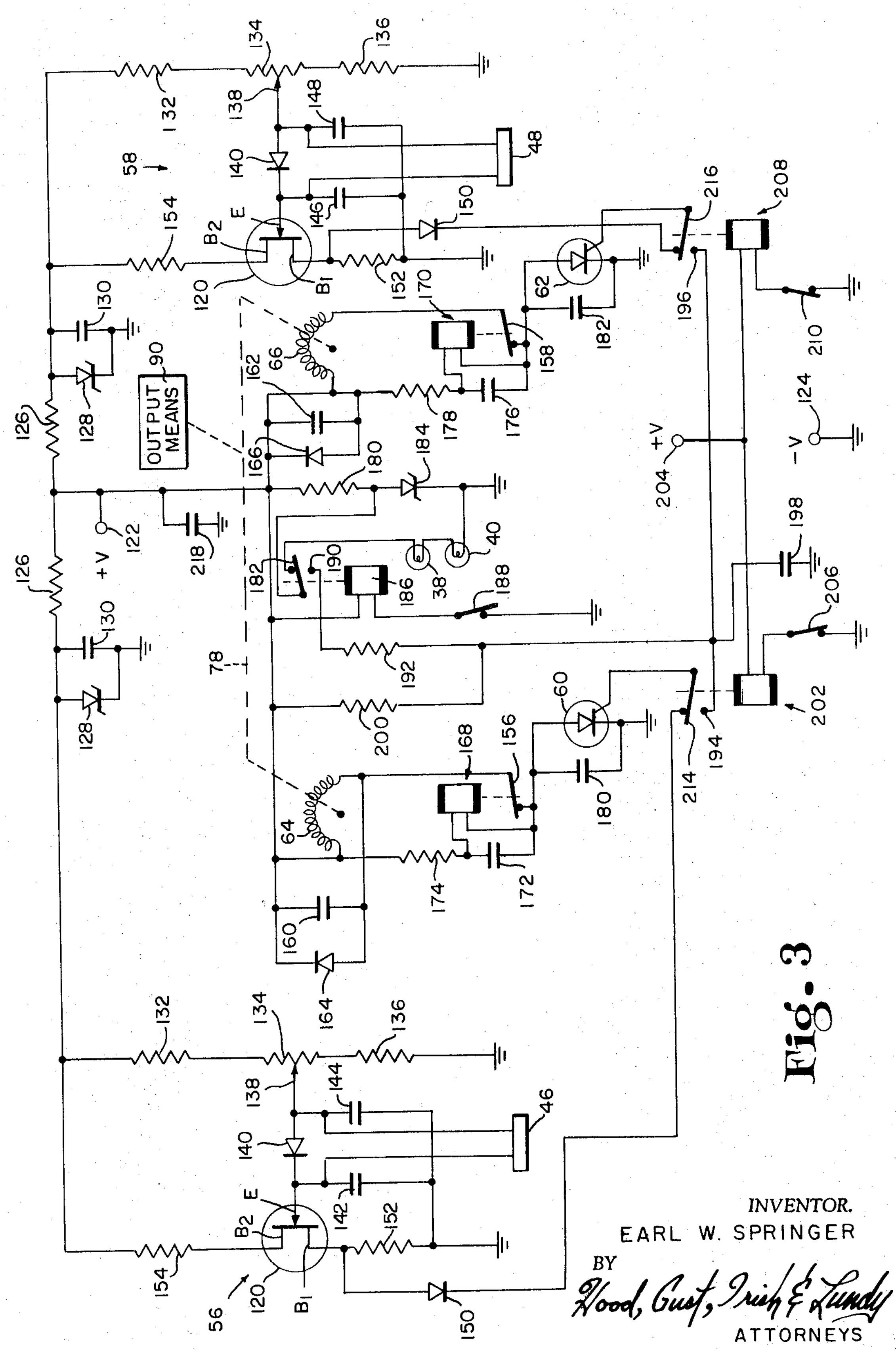
FIG. 3 is a schematic showing, in detail, the circuitry of the block diagrams of FIGS. 1 and 2.

Each amplifier means 56, 58, as illustrated in FIG. 3, can be described as a unijunction transistor amplifier or oscillator which has been modified to use the output of the photovoltaic-type sensing means 46, 48 and to provide an output suitable for triggering the silicon controlled rectifier 60, 62 connected thereto. This type of circuit may commonly be called a pulse-type oscillator. For a discussion of this general type of unijunction transistor circuit, I refer to the Transistor Manual published in 1964 by the General Electric Company, and particularly to the discussion of the circuit shown in FIG. 13.37 on page 326 of that manual. In this description, and in the claims appended hereto, the terms "amplifier means" is, therefore, intended to mean any means for responding to a relatively low level signal to provide a relatively high level signal output for operating a device, such as a silicon controlled rectifier, connected thereto.

Each of the illustrated amplifier means 56, 58, therefore, comprises a unijunction transistor 120 having an emitter electrode E, a base electrode $B_1$ and another base electrode $B_2$. I prefer to power each unijunction circuit with a 28 volt direct current power source connected across terminals 122, 124 and to connect in series a 200 ohm resistor 126 and a 18 volt Zener diode 128 across the terminals. As illustrated, I prefer to connect a 50 microfarad capacitor 130 across each Zener diode 128.

Each amplifier means 56, 58 also includes a voltage divider circuit consisting of a 34.8 kilohm resistor 132, a 20 kilohm potentiometer 134 and a 47 kilohm resistor 136 connected across its associated Zener diode 128 as illustrated. The wiper 138 of the potentiometer 134 is connected to the anode of a diode 140, the cathode of which is connected directly to the emitter electrode E of the unijunction transistor 120. The positive voltage termination of the photovoltaic cell 46, 48 connected to each amplifier means 56, 58 is connected to the cathode of the diode 140 and the negative voltage termination of the cell is connected to the anode of the diode.

In the amplifier means 56, I have connected a .5 microfarad capacitor 142 between the junction of the cathode of the diode 140 with the emitter E of the transistor 120 and ground and I have connected a .1 microfarad capacitor 144 between the junction of the anode of the diode 140 with the wiper 138 and ground. In the amplifier means 58, I have connected a .01 microfarad capacitor 146 between the junction of the cathode of the diode 140 with the emitter E of the transistor 120 and ground and I have connected a .1 microfarad capacitor 148 between the junction of the anode of the diode 140 with the wiper 138 and ground. It is the difference in capacitance provided by the capacitors 142 and 146 which provides the operational characteristic differences between the amplifier means 56, 58. That is, the frequency at which the amplifier means 56 will oscillate is determined by the .5 microfarad capacitor 142 while the frequency at which the amplifier means 58 will operate is determined by the .01 microfarad capacitor 146. The time required for breaking down the unijunction transistor 120 of the amplifier means 56 is determined by the time required to charge the capacitor 142 to the breakdown voltage level of the transistor and the time required for breaking down the transistor 120 of the amplifier means 58 is determined by the time required for charging the capacitor 146 to the breakdown voltage level of the transistor. These operation differences will be discussed in greater detail hereinafter.

The $B_1$ electrode of each transistor 120 is connected through a diode 150 to the gate control electrode of its associated silicon controlled rectifier 60, 62. Each $B_1$ electrode is also connected through a 25 ohm resistor 152 to ground. The $B_2$ electrode of each transistor 120 is connected through a 178 ohm resistor 154 to the high voltage side of the voltage divider circuit associated with the transistor.

As to amplifier means 56, when the photovoltaic cell 46 produces a predetermined potential for a predetermined period of time, its transistor 120 changes state or "breaks down" so that current can flow through its base electrodes $B_1$, $B_2$, this current being sufficient to trigger on the rectifier 60 connected thereto. As to amplifier means 58, when the photovoltaic cell 48 produces a predetermined potential for a predetermined period of time, its transistor 120 changes state or "breaks down" so that current can flow through its base electrodes $B_1$, $B_2$, this current being sufficient to trigger on the silicon controlled rectifier 62 connected thereto.

When the rectifier 60 is triggered on, current can flow from the positive voltage source 122 through the coil of the motor 64, a switch 156 and the rectifier 60 to ground, thereby to energize the motor to drive the shaft means 78 and the output means 90 in one direction for one step. When the silicon controlled rectifier 62 is triggered on, current can flow from the positive voltage source 122 through the coil of the motor 66, a switch 158 and the rectifier 62 to ground, thereby to drive the shaft means 78 and the output means 90 in the opposite direction one step.

For arc suppression reasons, I connect a .5 microfarad capacitor 160, 162 in parallel with the field coil of each motor 64, 66 and a diode 164, 166, in parallel with each such capacitor.

Further, in order to de-energize each motor 64, 66 a predetermined time after it is energized, I provide a relay 168, 170 for opening the switch 156, 158 through which the motor is energized. The field coil of the relay 168 is connected across a 1000 microfarad capacitor 172 which is connected in series with a 50 ohm resistor 174 between the positive voltage terminal 122 and the anode of the silicon controlled rectifier 60. Thus, when the rectifier 60 is triggered on, the relay 168 is energized a predetermined time thereafter determined by the charging time for the capacitor 172 to open the switch 156. Similarly, the field coil of the relay 170 is connected across a 1000 microfarad capacitor 176 which is connected in series with a 50 ohm resistor 178 between the positive voltage terminal and the anode of the silicon controlled rectifier 62.

I prefer to place a .5 microfarad capacitor 180, 182 across the anode-cathode electrodes of each rectifier 60, 62.

The lights 38, 40 associated, respectively, with sensing means 46, 48 are ignited by current flow from the positive voltage terminal 122 through a 75 ohm resistor 180 and a switch member 182, an 18 volt Zener diode 184 being connected across the lights as illustrated. The switch member 182 is a contact member of a relay 186 which is energized by current flow through a slue switch 188. When the relay 186 is energized, the contact member 182 is switched into contact with a contact member 190 to de-energize the lights 38, 40 and to connect the positive voltage terminal 122 through the resistor 180 and a 4 kilohm resistor 192 to contact members 194, 196. These contact members 194, 196 are also connected through a 1 megohm resistor 200 to the positive voltage terminal 122. I prefer to place a .1 microfarad capacitor 198 between the contact members 194, 196 and ground. When the relay 186 is energized, each of the contact members 194, 196 is, therefore, connected through a parallel circuit to the positive voltage terminal 122, one leg of the parallel circuit including the resistor 200 and the other leg of the parallel circuit including the resistor 192 and the resistor 180.

In the illustrative embodiment, I have provided a relay 202 which is energized by current flow from a positive voltage terminal 204 through a remote switch 206 and another relay 208 which is energized by current flow from the terminal 204 through another remote switch 210. It will be appreciated that the contact member 194 is a contact member of the relay 202 and the contact member 196 is a contact member of the relay 208.

The relay 202 includes a movable contact member 214 through which the gate control electrode of the rectifier 60 is connected to the amplifier means 56 and the relay 208 includes a movable contact member 216 through which the gate control electrode of the rectifier 62 is connected to the amplifier means 58. When the relay 202 is energized by closing the switch 206, the contact member 214 is contacted to the contact member 194 so that the gate control electrode of the rectifier 60 sees constantly the potential on the contact member 194. Similarly, when the relay 208 is energized, the member 216 is contacted to the contact member 196 so that the gate control electrode of the rectifier 62 sees the potential on the contact member 196.

The relays 202, 208 and their respective switches 206, 210 are provided for driving the output means 90 manually to a selected position. In order manually to drive the support plate 34 on which the sensing means 46, 48 and the lights 38, 40 are mounted, it is necessary to turn out the lights 38, 40 so that the sensing means 46, 48 can move past the pointer 14 of the altimeter 12. It will be appreciated that this feature is made available so that a pilot of an aicraft utilizing my altitude indicating system can drive the output means 90 so that it provides an output corresponding to the reading of the pilot's instrument panel altimeter. In order to drive the output means 90 to indicate a higher altitude, the pilot must close the switch 206 and the switch 188 and, in order to drive the output means 90 to indicate a lower altitude, the pilot must close the switch 210 and the switch 188.

Finally, as illustrated, I prefer to place a 50 microfarad capacitor 218 between the positive voltage terminals 122 and ground.

It will be appreciated that the resistance and capacitance values provided in the above-description are merely illustrative. Other resistance and capacitance values may be used within the scope of my invention. The values of resistance and capacitance which I have selected are determined primarily by the provision of a 28 volt power source normally found in aircraft as well as the operational characteristics of the semiconductor devices in my system.

With reference to FIG. 3, it will be appreciated that the amplifier means 56 includes a form of resonant circuit based on the time required to charge the .5 microfarad capacitor 142 to the point where the transistor 120 "breaks down" between its emitter E and base $B_1$. The time period between "break downs" of the transistor is nearly a constant, thereby providing a time cycle form of selectivity corresponding to that experienced with a tuned resonant circuit consisting of resistance, inductance and capacitance. The circuit resistance becomes very low at the moment of "break down."

Further, I have found that the greater the difference in oscillating frequencies of the amplifier means 56, 58, the less the chance per unit of time that both amplifier means will be ready for "break down" at the same time.

The static condition of each amplifier means 56, 58 is such that it will require a boost voltage from the solar cell 46, 48 connected thereto when light is reflected upon the solar cell by the altimeter pointer 14 in order for the transistor 120 of the amplifier means to "break down." It will be appreciated that the solar cell 46 must provide this boost voltage for the amplifier means 56 for a significantly greater length of time than the solar cell 48 must provide the boost voltage for the amplifier means 58. This is because, for a given charging voltage, the length of time required to charge the .5 microfarad capacitor 142 is greater than is required to charge the .01 microfarad capacitor 146.

The pulse duration from the amplifier means 58 is less, because of the higher pulse frequency, than the pulse duration of the amplifier means 56 so that, if there is cross-talk from the amplifier means 58 to the amplifier means 56, the duration of such cross-talk may not last long enough to cause the transistor 120 of the amplifier means 56 to "break down" without assistance from its solar cell 46. Now, when there is cross-talk from the amplifier means 56 to the amplifier means 58, there may be a greater tendency for the transistor 120 of the amplifier means 58 to "break down," primarily because of the duration of the signal received from the amplifier means 56. I believe that the resonant effect is helpful in preventing signals received by the amplifier means 58 from the amplifier means 56 from "breaking down" the transistor 120 of the amplifier means 58 without a boost voltage by the solar cell 48.

Because of the higher frequency operation of the amplifier means 58, for a given output by its associated solar cell 48, it will operate the rectifier 62 faster than the amplifier means 56 will operate the rectifier 60 for the same output by its associated solar cell 46. That is, the amplifier means 58 responds faster to movement of the pointer 14 toward the solar cell 48 than the amplifier means 56 responds to movement of the pointer 14 toward the solar cell 46. Thus, the potentiometer 134 may be adjusted so that the gain of the amplifier means 58 is slightly lower than the gain of the amplifier means 56. Any reduction of gain tends to decrease crosstalk effects.

In normal operation, it is expected that my altitude indicating system must be designed so that it can follow the 100 feet pointer 14 of the altimeter 12 at a climb or descent rate of 25,000 feet per minute. This represents 4.15 steps per second. My system is designed to operate at 100 feet steps, i.e., 10 steps per revolution of the pointer 14. Thus, to allow for a margin of error, the lowest possible pulse rate would be at least 10 pulses per second. I prefer that the amplifier means 56 operate at approximately 15 pulses per second. I prefer that the amplifier means 58 operate at approximately 200 pulses per second which, for the stated climb and descent rate, provides sufficient margin. It will be appreciated that, as to the higher frequencies, the power in each pulse decreases so that, for a given voltage and current input to the system, it is necessary to keep the frequency low enough to trigger on the silicon controlled rectifier 62. This is especially true at the lower temperatures at which the system must operate because the voltage requirements for triggering on silicon controlled rectifiers almost double between the temperatures of +25° C. and −60° C.

What is claimed is:

1. A system comprising an output means and circuit means for operating said output means, said circuit means including one network for driving said output means in one direction and a second network for driving said output means in the opposite direction, said one network including first means the output of which has a predetermined pulse repetition rate which does not significantly vary and said second network including second means the output of which has a second and significantly different predetermined pulse repetition rate which does not significantly vary, each of said first and second means being a pulse-type oscillator of the type triggered to provide such a pulse output when a direct current nonoscillatory signal is provided to its input, whereby the likelihood that spurious signals developed by operation of one of said networks will cause operation of the other of said networks is substantially eliminated.

2. The system of claim 1 in which said output means includes a driven device, a first stepping motor for driving said device in said one direction and a second stepping motor for driving said device in said opposite direction, in which said one network includes first switch means for energizing said first stepping motor, said first switch means being connected to and operated by said first means, and in which said second network includes second switch means for energizing said second stepping motor, said second switch means being connected to and operated by said second means.

3. An altitude indicating system comprising output means, first means for driving said output means in one direction, second means for driving said output means in the opposite direction, first sensing means, second sensing means, first circuit means for operatively connecting said first sensing means to said first drive means, said first circuit means including first switch means for energizing said first drive means and first means for operating said first switch means to energize said first drive means when said first sensing means provides a predetermined output, and second circuit means for operatively connecting said second sensing means to said second drive means, said second circuit means including second switch means for energizing said second drive means and second means for operating said second switch means to energize said second drive means when said second sensing means provides a predetermined output, said first means being effective to provide an output having a predetermined pulse repetition rate and said second means being effective to provide an output having a second and significantly different pulse repetition rate.

4. The system of claim 3 in which said first means includes a first conventional unijunction transistor having base electrodes $B_1$ and $B_2$ and an emitter electrode E, said base electrode $B_1$ being connected to said first switch means so that, when a predetermined voltage is applied to said emitter electrode E, said first switch means will be operated by current flow through said base electrodes, and a first input circuit arranged to cause oscillation of said first means at said first predetermined repetition rate, said first input circuit being connected to said emitter electrode E, said first input circuit including a first capacitor connected between said emitter electrode E and ground, and said first input circuit being effective to charge said first capacitor to such a predetermined voltage level, and in which said second means includes a second conventional unijunction transistor having base electrodes $B_1$ and $B_2$ and an emitter electrode E, the last-said $B_1$ electrode being connected to said second switch means so that, when a predetermined voltage is applied to said emitter electrode E of said second transistor, said second switch means will be operated by current flow through said base electrodes of said second transistor, and a second input circuit arranged to cause oscillation of said second means at said second predetermined repetition rate, said second input circuit being connected to said emitter electrode E of said second transistor, said second input circuit including a second capacitor connected between said emitter electrode E of said second transistor and ground, and said second input circuit being effective to charge said second capacitor to such a predetermined voltage.

5. The system of claim 4 in which said first capacitor provides a first capacitance and in which said second capacitor provides a second and significantly different capacitance.

6. The system of claim 5 in which said first sensing means includes a first light-responsive means for providing such a predetermined output when light impinges thereon, the output of said first sensing means being in the form of a potential applied to said first input circuit to cause charging of said first capacitor, and in which said second sensing means includes a second light-responsive means for providing such a predetermined output when light impinges thereon, the output of said second sensing means being in the form of a potential applied to said second input circuit to cause charging of said second capacitor.

7. The system of claim 3 in which each of said first and second means is a pulse-type oscillator of the type triggered to provide a pulse output when a direct current non-oscillatory signal is provided to its input.

8. The system of claim 3 in which said first means includes a first pulse-type oscillator comprising a first capacitor, the value of which establishes the said first repetition rate at which said first means oscillates and the time duration required for receiving a signal from said first sensing means to operate said first switch means, and in which said second means includes a second pulse-type oscillator comprising a second capacitor, the value of which establishes the said second repetition rate at which said second means oscillates and the time duration required for receiving a signal from said second sensing means to operate said second switch means, the values of said first and second capacitors being significantly different.

References Cited

UNITED STATES PATENTS

| | | | |
|---|---|---|---|
| 2,182,717 | 12/1939 | Chance | 318—31 |
| 2,182,696 | 12/1939 | Janeway, Jr. | 318—31 |
| 3,096,467 | 7/1963 | Angus et al. | 318—480X |
| 3,202,967 | 8/1965 | Wolff | 318—16X |

BENJAMIN DOBECK, Primary Examiner

U.S. Cl. X.R.

318—480